Aug. 14, 1934.     G. A. ROBBINS     1,970,195
METAL WINDOW
Filed Sept. 2, 1931

Inventor
GEORGE A. ROBBINS
By
his Attorneys

Patented Aug. 14, 1934

1,970,195

UNITED STATES PATENT OFFICE 1,970,195

METAL WINDOW

George A. Robbins, Hilliar Township, Knox County, Ohio

Application September 2, 1931, Serial No. 560,792

4 Claims. (Cl. 189—64)

This invention relates to windows and has for its principal object to provide an improved construction in which mullions carrying lights of glass are dispensed with. A further object is to provide a construction in which the glass can be slid laterally to open and close the window, laterally arranged boxes between the top and bottom strips being provided into which the glass can be slid and substantially concealed when the window is "wide open". Other objects are improvements in details of construction all as hereinafter set forth.

The invention is embodied in the example herein particularly shown and described, the features of novelty being finally claimed.

In the accompanying drawing—

Figure 1:
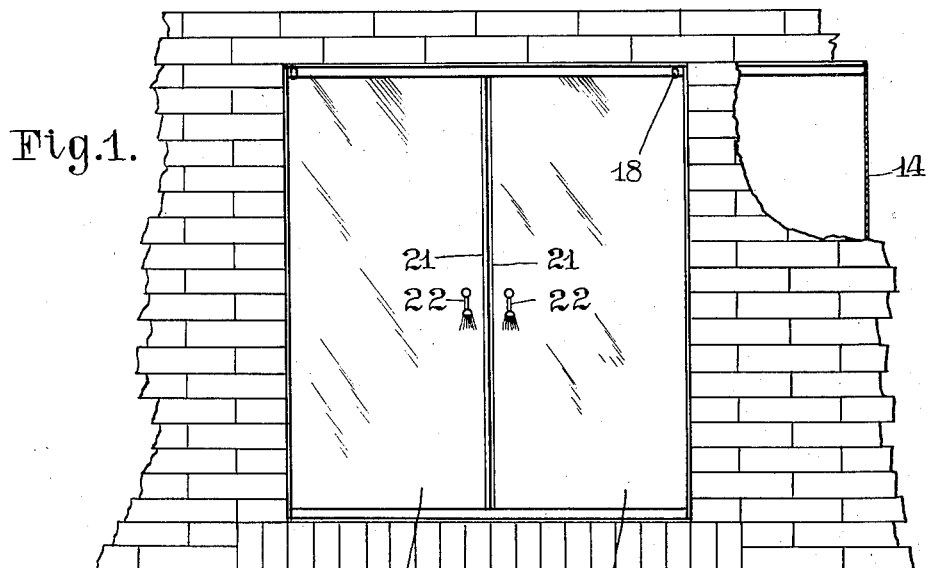
Figure 1 is an interior elevation of a fraction of a tile wall partly broken out and showing the window according to the invention installed therein.
Figure 3:
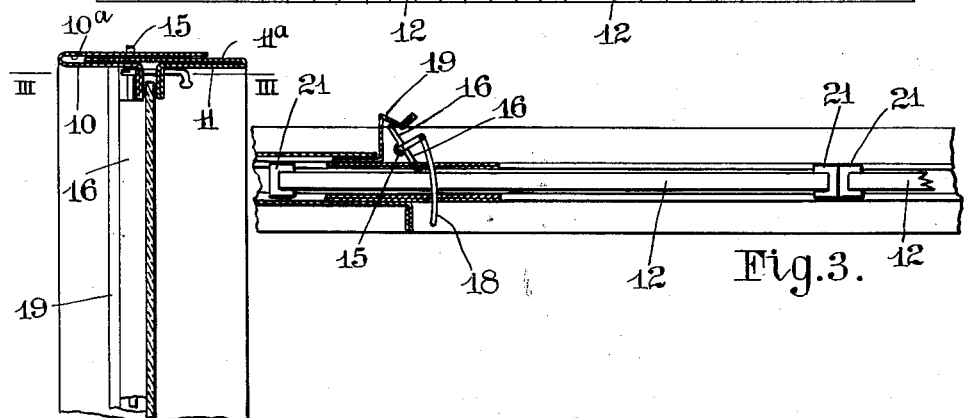
Fig. 3 is a horizontal section on the line III—III Fig. 2.
Figures 2, 4:
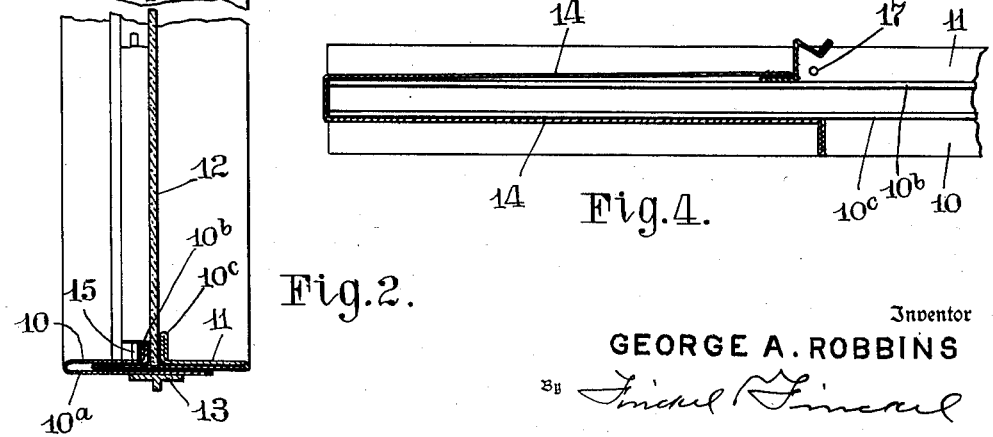
Fig. 2 is a vertical section on a larger scale showing the top and sill or bottom portions of the window frame.
Fig. 4 is a sectional detail of one of the end boxes to receive the glass panes when the window is opened.

Referring to the views the top and sill portions of the frame constitute tracks for the glass and are formed out of sheet metal, each in two parts, one as at 10, bent to form a flat pocket or groove 10ª and the other, as at 11, to form a leg 11ª that can be slipped into the groove 10ª. The two parts 10 and 11 are bent upward and folded to form lips 10ᵇ and 10ᶜ for stiffness and to form a groove or track to receive the glass panes 12.

By reason of this construction the sheet metal frame parts of the tracks are adjustable toward or from each other to make the glass-receiving grooves of the desired width according to the thickness of the glass to be used. The sill portion is stiffened with an angle bar 13 soldered or welded to the lower side of the groove-forming web. After the frame is installed in the building the glass panes are inserted into the upper and lower grooves by first shoving the upper edge of each upward into the upper groove and then swinging the lower edge over until it can be let down into the lower groove, after which the glass rests by gravity in the lower groove and each can be slid laterally into the boxes 14 inclosed by the wall.

A weather strip device is provided for each vertical side of the casing, each including a rod 15 of metal equipped with strips, in wing fashion, of rubber 16, said rod being set or pivoted in holes as at 17 in the top and bottom guide bars of the frame at the outer side of the window. The weather strip is operated from the interior side by means of a rod 18 that is extended through a small hole in the top of the metal frame; and a vertical angular strip 19 is secured to each side of the casing to afford a stop for the outer wing of the weather strip.

14 designates the end boxes into which the glass panes are slidable, said boxes being formed of sheet metal secured all around at the top and bottom to extensions of the top and bottom glass-receiving guide rails except at one side of the box.

All the vertical edges of the glass panes can be provided with bumper strips 21 of rubber to prevent the glass from chipping by violent contacts.

A strong cord 22 with a tassel or handle can be attached to each glass for drawing it into or out the end box, such cord being attached by means of a small hole drilled through the glass.

Any suitable and obvious means can be provided to prevent the glasses from being moved to open the window from the outer side.

In practice it will be understood, of course, that the housings into which the glass is slid will be inclosed and concealed in brick, frame, plaster or the building material according to the character of the construction.

The forms of the parts can be changed without departing from the gist of the invention as claimed.

What I claim is:

1. A window casing including top and bottom glass-receiving guides, an associated end box into which a glass pane can be slid, and a weather strip pivoted to the casing to engage said glass.

2. A window casing including top and bottom glass-receiving guides, an associated end box into which a glass pane can be slid, a weather strip pivoted to the casing to engage the glass and a strip stop housing for said weather strip secured to the casing.

3. A window casing including top and bottom glass receiving guides, an associated end box into which a glass pane can be slid, an angular strip stop housing secured to said casing and offset therefrom, a weather strip including a rod journaled to said casing and provided with flexible weather strip material extending in wing fashion therefrom, said rod adapted to be turned to cause the flexible material to bear against both the stop housing and the glass pane.

4. A window casing for receiving, supporting and guiding a horizontally slidable light of glass, said casing at its bottom formed of two parts of sheet metal, each of said parts bent to form a two ply upwardly projecting yielding glass retaining rib projecting vertically one of said ribs being of greater height than the other and one of said sheet metal parts bent to form a horizontal base portion having a horizontal groove and the other of said sheet metal parts bent to form a base portion having a leg closely fitting in said groove, said last named leg forming the glass supporting bottom of the groove formed by said ribs and whereby said parts may be adjusted to increase or diminish the space between said glass retaining ribs to receive different thicknesses of glass.

GEORGE A. ROBBINS.